(12) United States Patent
Steinert

(10) Patent No.: US 11,127,231 B2
(45) Date of Patent: *Sep. 21, 2021

(54) ADAPTIVE ALGORITHM-BASED ENGINE HEALTH PREDICTION

(71) Applicant: Textron Innovations Inc., Providence, RI (US)

(72) Inventor: Alan H. Steinert, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/381,416

(22) Filed: Apr. 11, 2019

(65) Prior Publication Data

US 2019/0244443 A1 Aug. 8, 2019

Related U.S. Application Data

(63) Continuation of application No. 15/286,209, filed on Oct. 5, 2016, now Pat. No. 10,282,925.

(60) Provisional application No. 62/239,058, filed on Oct. 8, 2015.

(51) Int. Cl.
| | | |
|---|---|---|
| *G07C 5/08* | (2006.01) | |
| *G05B 23/02* | (2006.01) | |
| *G07C 5/00* | (2006.01) | |
| *B64D 45/00* | (2006.01) | |
| *G06F 7/08* | (2006.01) | |

(52) U.S. Cl.
CPC ............ *G07C 5/085* (2013.01); *B64D 45/00* (2013.01); *G05B 23/0221* (2013.01); *G05B 23/0243* (2013.01); *G06F 7/08* (2013.01); *G07C 5/008* (2013.01); *G07C 5/0808* (2013.01); *G07C 5/0816* (2013.01); *B64D 2045/0085* (2013.01)

(58) Field of Classification Search
CPC ...... G07C 5/085; G07C 5/008; G07C 5/0808; G07C 5/0816; B64D 45/00; B64D 2045/0085; G05B 23/0221; G05B 23/0243; G06F 7/08
USPC .......................................................... 701/99
See application file for complete search history.

(56) References Cited

U.S. PATENT DOCUMENTS

| | | |
|---|---|---|
| 8,914,205 B2 | 12/2014 | Chandran et al. |
| 10,024,187 B2* | 7/2018 | Soares, Jr. ............ F01D 21/003 |
| 2003/0045992 A1 | 3/2003 | Humerickhouse et al. |
| 2005/0096873 A1 | 5/2005 | Klein |
| 2011/0172895 A1 | 7/2011 | Fukumoto et al. |
| 2013/0024179 A1 | 1/2013 | Mazzaro et al. |

(Continued)

FOREIGN PATENT DOCUMENTS

CN 103728965 A 4/2014

OTHER PUBLICATIONS

Wittman-Regis, Agnes, "International Preliminary Report on Patentability" for PCT/US2016/055815, dated Apr. 10, 2018, 6 pages.

(Continued)

*Primary Examiner* — Paula L Schneider
(74) *Attorney, Agent, or Firm* — Shackelford, Bowen, McKinley & Norton, LLP

(57) ABSTRACT

A system and algorithm-based method of determining engine health and assuring available propulsion power based on historical data reflecting the individual engine's unique performance "fingerprint."

20 Claims, 7 Drawing Sheets

(56) References Cited

U.S. PATENT DOCUMENTS

2014/0236534 A1    8/2014  Ling et al.
2015/0006097 A1    1/2015  Gao et al.

OTHER PUBLICATIONS

International Search Report and Written Opinion of the International Searching Authority for related International Patent Application Serial No. PCT/US2016/055815, dated Jun. 15, 2017, 8 pages.
Donald L. Simon, et al., Aircraft Engine Gas Path Diagnostic Methods: Public Benchmarking Results, ASME Journal of Engineering for Gas Turbines and Power, Apr. 2014, vol. 136, 10 pages.
Michel L. Verbist, et al., Experience with Gas Path Analysis for On-Wing Turbofan Condition Monitoring, ASME Journal of Engineering for Gas Turbines and Power, Jan. 2014, vol. 136, 8 pages.
Pierre Dewallef & Sebastien Borguet, A Methodology to Improve the Robustness of Gas Turbine Engine Performance Monitoring Against Sensor Faults, ASME Journal of Engineering for Gas Turbines and Power, May 2013, vol. 135, 7 pages.
Allan J. Volponi, Gas Turbine Engine Health Management: Past, Present, and Future Trends, ASME Journal of Engineering for Gas Turbines and Power, May 2014, vol. 136, 20 pages.
Donald L. Simon & Jonathan S. Litt, Automated Power Assessment for Helicopter Turboshaft Engines, 64th Annual Forum and Technology Display (AHS Forum 64), Apr. 29-May 1, 2008, 13 pages.

\* cited by examiner

ADAPTIVE ALGORITHM-BASED ENGINE HEALTH PREDICTION

CROSS-REFERENCE TO RELATED APPLICATIONS

This application is a continuation of U.S. patent application Ser. No. 15/286,209, filed on Oct. 5, 2016. U.S. patent application Ser. No. 15/286,209, claims the benefit of provisional U.S. Patent Application No. 62/239,058, filed on Oct. 8, 2015. Application No. 62/239,058 and application Ser. No. 15/286,209 are incorporated herein by reference in their entirety.

STATEMENT REGARDING FEDERALLY SPONSORED RESEARCH OR DEVELOPMENT

This invention was made with Government support under contract N00019-09-D-0008 awarded by the Naval Air Systems Command. The Government has certain rights in this invention.

FIELD OF THE INVENTION

The application generally relates to monitoring and predicting engine health and, more particularly, to a system and algorithm-based method of determining engine health and assuring available propulsion power.

BACKGROUND OF THE INVENTION

Aircraft engine health is typically monitored using a Power Assurance Check ("PAC"). PACS generally measure and calculate engine horsepower as a function of measured gas temperature ("MGT"), corrected measured gas temperature ("MGTc"), or corrected gas generator speed ("NGc") under steady operating conditions, before comparing that performance level to a baseline specification. The comparison to the baseline specification provides an indication of engine health level. PACs, however, have several limitations.

As one example, a PAC requires several minutes of stable, steady-state operation—i.e., in the case of a rotorcraft, several minutes of hover—in order to be performed accurately. To perform an automated PAC, a rotorcraft might have to hover for up to five minutes in relatively stable, wind-free conditions. If such conditions are not maintained for an adequate time period, the PAC routine will abort. Alternatively, a manual PAC can be performed. While a manually performed PAC will not abort because of a shorter period of stable, steady-state operation, accuracy will suffer if the period of steady operation is significantly shorter. Manually performed PACs also introduce human error in plotting performance data points, charting a line or curve on a graph, and interpreting the graph to predict available power and determine engine health. And manual performance of a PAC can be burdensome for a flight crew, or require additional personnel. For instance, for an aircraft requiring two pilots, one pilot must fly the aircraft while the other records the data and interprets the results. Alternatively, the flight crew could include a flight engineer to perform the PAC analysis, but the additional crew member diminishes the aircraft's capacity.

Another limitation of PACs is that it generally assumes that if, for example, an engine is providing 100%/o of baseline performance at one load level, it will provide 100%/o performance at higher loads as well. But engine health often differs at different engine load levels. As a result, for example, a PAC can indicate 100% engine health, only to have the pilots find that only 94% of the predicted power level is actually available when they reach higher altitude, attempt to lift heavier loads, or enter worse operating environments. Thus, the flight crew might find that the engine is marginal when its performance is most crucial.

Yet another limitation of PACs is that, for best accuracy, a PAC should be performed at high engine loads, e.g., within about 100° F. of the engine's maximum MGT rating. But reaching such a high engine load can require high altitudes, heavier aircraft loads, and/or high outside air temperatures. These can be difficult or impossible to acquire, depending on conditions.

Consequently, a need exists for an engine health assessment system and method that: (1) does not require several minutes of stable, steady-state operation; (2) does not place a significant burden on the flight crew; (3) accurately predicts engine health and performance levels at all operating loads and power levels, based on historical data reflecting the individual engine's unique performance "fingerprint"; and (4) does not require operation at high power levels and loads to obtain accuracy. These and other advantages of the present invention will become apparent to one skilled in the art.

SUMMARY OF THE INVENTION

In one aspect, the invention includes a method for collecting engine data for use in determining the health of an engine on an aircraft, the method comprising: receiving engine operating information; determining from the engine operating information a power parameter and a critical parameter; recording as a data point the power parameter and the critical parameter; and merging the data point with a stored data set, the stored data set including previously recorded power parameter and critical parameter data points.

In another aspect, the invention includes a method of determining the health of an engine on an aircraft, the method comprising: selecting an engine performance curve to use in creating an engine health model; executing a curve-fitting process to obtain a fitted curve, the fitted curve being based on the selected engine performance curve and a stored data set; evaluating engine health by comparing the fitted curve to a 100% specification-level performance curve for the engine; and outputting engine health information.

In a third aspect, the invention includes a method of determining the health of an engine on an aircraft, the method comprising: receiving engine operating information; determining from the engine operating information a power parameter and a critical parameter; recording as a data point the power parameter and the critical parameter; merging the data point with a stored data set, the stored data set including previously recorded power parameter and critical parameter data points; selecting an engine performance curve to use in creating an engine health model; obtaining a fitted curve by translating and rotating the selected engine performance curve to achieve a low error with respect to the stored data set; evaluating engine health by comparing the fitted curve to a 100% specification-level performance curve for the engine; and outputting engine health information.

BRIEF DESCRIPTION OF THE DRAWINGS

Preferred features of certain embodiments of the present invention are disclosed in the accompanying drawings, wherein similar reference characters denote similar elements throughout the several views, and wherein.

DETAILED DESCRIPTION

The embodiments of the present invention will now be described more fully, with reference to the accompanying drawings, in which preferred embodiments of the invention are shown. This invention may, however, be embodied in many different forms and should not be construed as limited to the illustrated embodiments set forth herein. Rather, the illustrated embodiments are provided so that this disclosure will be thorough and complete and will convey the scope of the invention to those skilled in the art.

In the interest of clarity and brevity, all features of an embodiment may not be described. In the development of any actual embodiment, numerous implementation-specific decisions must be made to achieve the developer's specific goals, such as compliance with system-related and business-related constraints, which will vary from one implementation to another. While such a development effort might be complex and time-consuming, it would, nevertheless, be a routine undertaking for those of ordinary skill in the art having the benefit of this disclosure.

The invention is described, in part, with the help of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components (e.g., memory elements, digital signal processing elements, logic elements, look-up tables, or the like), which may carry out a variety of functions under the control of one or more microprocessors or other control devices. Furthermore, the connecting lines shown in the various figures are intended to represent exemplary functional relationships and/or physical couplings between the various elements. However, one skilled in the art will appreciate that many alternative or additional functional relationships or physical connections may be present in an embodiment.

Figure 1:
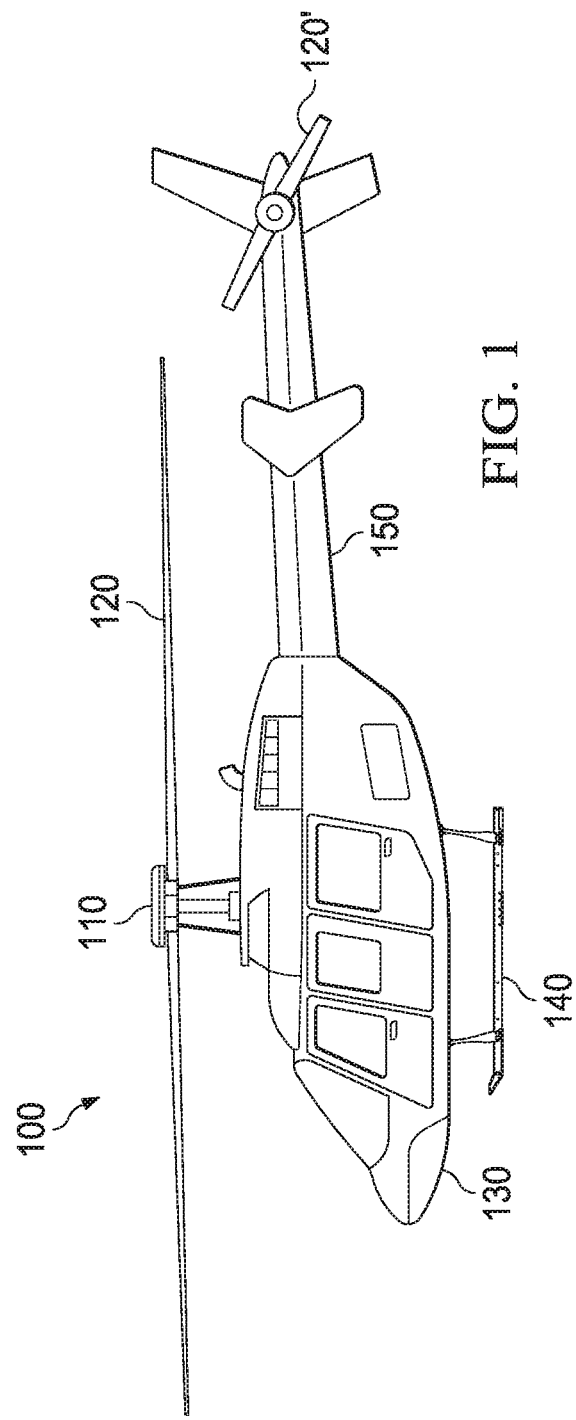
FIG. 1 shows a rotorcraft according to one embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

Figure 2:
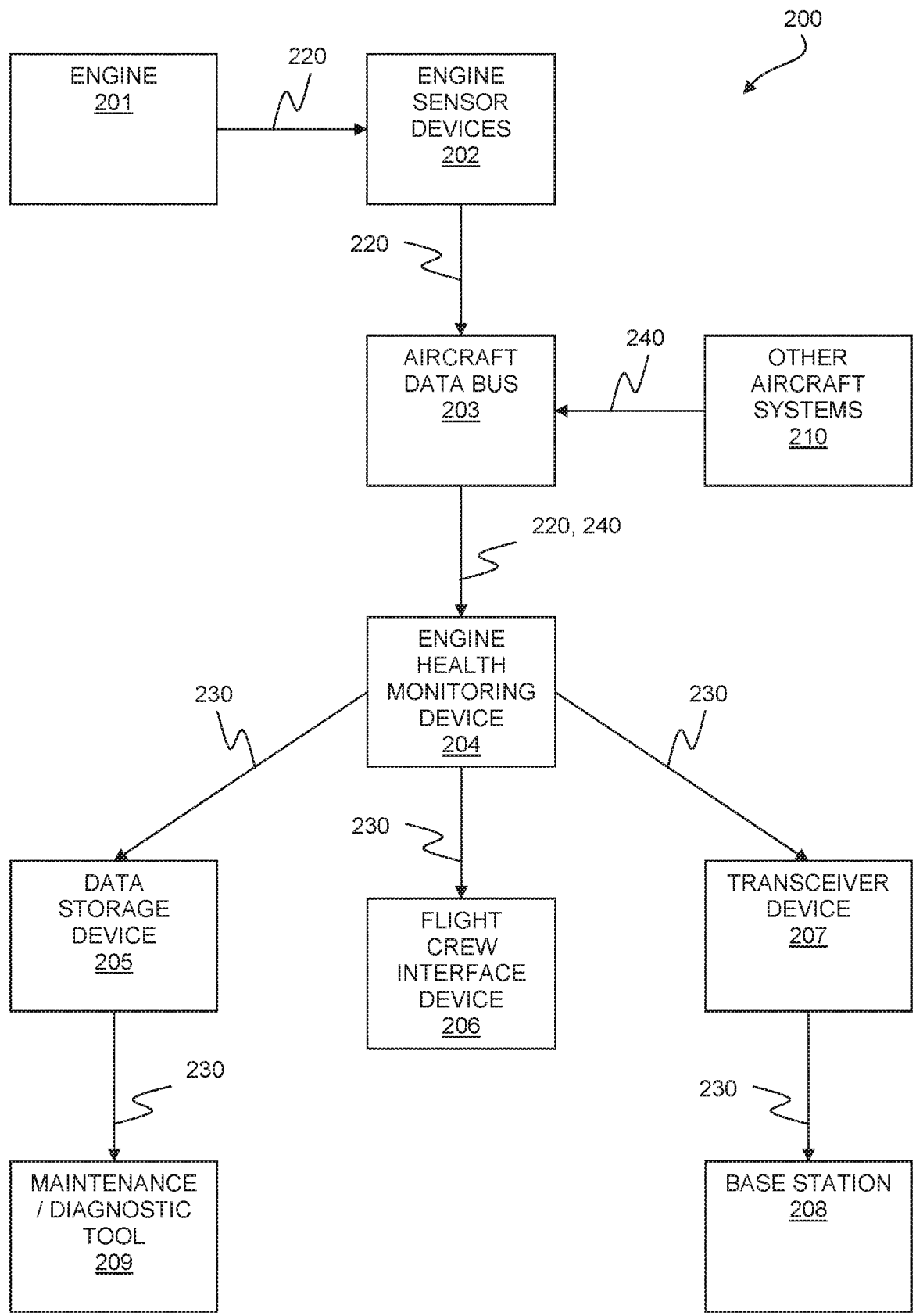
FIG. 2 is a block diagram of an engine health system according to one embodiment.

Referring now also to FIG. 2, an exemplary engine health system 200 includes an engine 201, which provides power to rotor system 110. One skilled in the art will appreciate that the engine health system 200 may, alternatively, include multiple engines 201. The engine health system 200 further includes one or more engine sensor devices 202, which are configured to transmit engine operating information 220. For example, engine sensor devices 202 may measure, calculate, estimate, and/or transmit information such as MGT, MGTc, NGc, torque output, horsepower output, etc. The engine sensor devices 202 provide the engine operating information 220 via an aircraft data bus 203. Aircraft data bus 203 may be a conductive-wire serial data bus, such as a data bus compliant with MIL-STD-1553, or a fiber optic data bus, such as a data bus compliant with MIL-STD-1773. An engine health monitoring device 204 collects the engine operating information 220 via the aircraft data bus 203 and processes the engine operating information 220 as described below with reference to FIGS. 3-10.

After processing the engine operating information 220 collected from the aircraft data bus 203, the engine health monitoring device 204 provides engine health information 230 to one or more output devices. In the embodiment of FIG. 2, the output devices include: data storage device 205, flight crew interface device 206, and transceiver device 207. While engine health monitoring device 204, data storage device 205, flight crew interface device 206, and transceiver device 207 are depicted as being separate devices, one of ordinary skill in the art will appreciate that two or more of these devices may be combined into a single component. For instance, in an alternative embodiment, all of these devices 204, 205, 206, 207 may be integrated into a single component. Additionally, FIG. 2 depicts a data storage device 205, a flight crew interface device 206, and a transceiver device 207 each connected directly to the engine health monitoring device 204. However, a variety of physical connections among these devices is possible. For example, in an alternative embodiment, each of these devices may be interconnected via the aircraft data bus 203.

Data storage device 205 is configured to store the engine health information 230 for retrieval. As one example, data storage device 205 may include a data port that allows the engine health information 230 to be downloaded and analyzed at regular intervals. Data storage device 205 may be queried, either by on-board systems that provide periodic or on-demand queries, or by an off-aircraft maintenance and diagnostic tool 209. More specifically, such queries may be generated by—or communicated through—aircraft data bus 203, the engine health monitoring device 204, flight crew interface device 206, off-aircraft maintenance and diagnostic tool 209, and/or other components and systems. When responding to a query, data storage device 205 communicates engine health information 230 to one or more of the aircraft data bus 203, engine health monitoring device 204, flight crew interface device 206, transceiver device 207, base station 208, off-aircraft maintenance and diagnostic tool 209, and/or other components and systems. Data storage device 205 can also serve as a repository for the stored data set 330 (see FIGS. 5-10).

Flight crew interface device 206 is configured to provide the engine health information 230 to the flight crew. As one example, the flight crew interface device 206 may include a gauge or display screen that indicates engine health information 230. Such gauges or display screens may continuously indicate the engine health information 230, or such information 230 may be available on-demand. For example, a button pressed in the cockpit may prompt engine health information 230 to become displayed on a screen. As another example, the flight crew interface device 206 may include warning indicators, lights, tactile alerts, or audible alarms that alert the flight crew in the event that the engine health information 230 falls outside of a predetermined range.

Transceiver device 207 is configured to transmit engine health information 230 off-aircraft. For example, transceiver device 207 may transmit engine health information 230 to a base station 208 while the aircraft is in operation. Base station 208 may be a maintenance database, grounds crew, mobile command center, chase vehicle or aircraft, etc. One skilled in the art will appreciate that transceiver device 207 need not be a dedicated transceiver operable to transmit and receive only engine health 230 and related information. Rather, transceiver device 207 may be a multipurpose transceiver configured to transmit and receive other information in addition to engine health information 230, including for example, voice data, GPS data, HUMS data, control commands in the case of an unmanned vehicle, etc.

Referring still to the embodiment of FIG. 2, other aircraft systems 210 are in communication with aircraft data bus 203. More specifically, other sensors and processors make available via the aircraft data bus 203 additional information relating to the aircraft and/or the operating environment 240, for instance: (1) altitude; (2) outside air temperature; (3) whether there is weight on the landing gear 140; (4) whether the aircraft is flying in helicopter mode, airplane mode, or somewhere in between (in the case of a tiltrotor or tiltwing aircraft); (5) engine inlet configuration or restriction information; and/or (6) exhaust configuration or restriction information. The engine health monitoring device 204 may optionally process this additional information 240, along with the engine operating information 220, in order to determine the engine health information 230.

Figure 3:
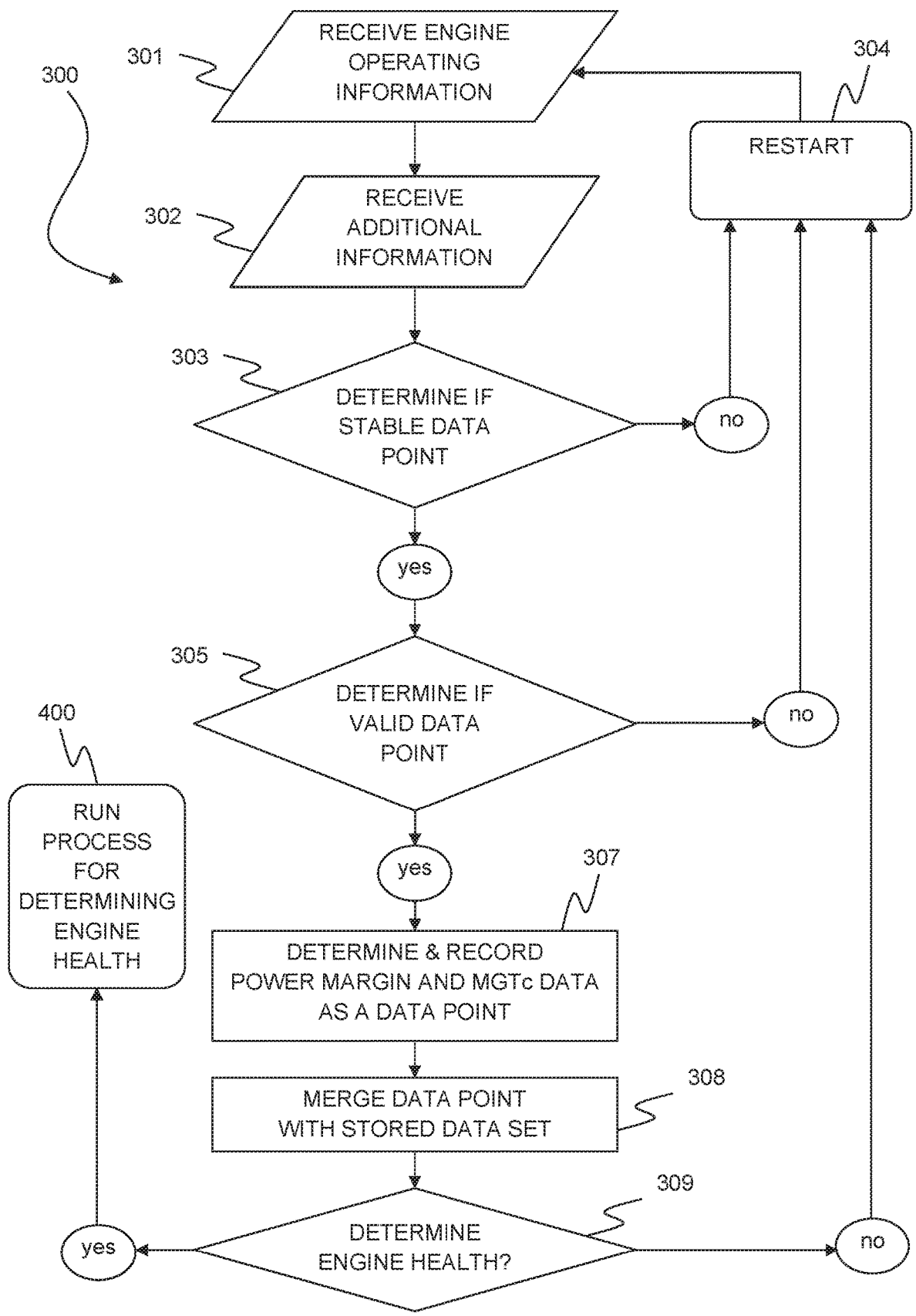
FIG. 3 is a flow chart of representing a data collection process according to one embodiment.
Figure 4:
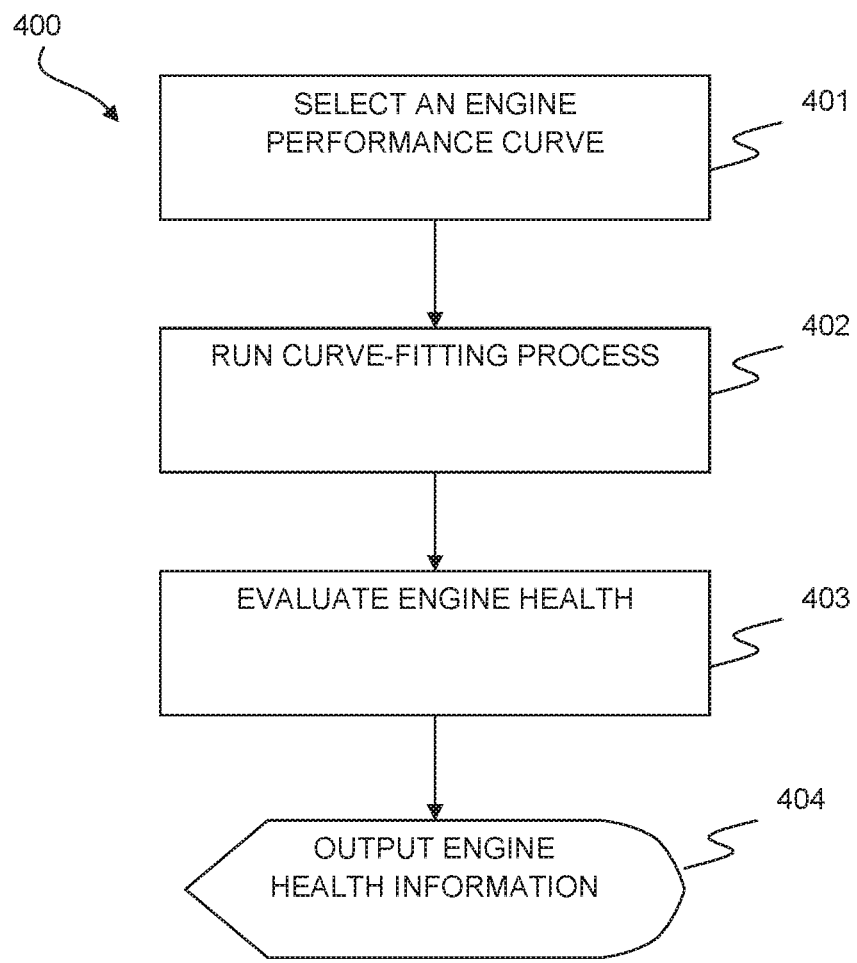
FIG. 4 is a flow chart of representing a process for determining engine health according to one embodiment.

FIGS. 3 and 4 depict flowcharts for a data collection process 300 and a process for determining engine health 400, respectively. These processes 300, 400 may be performed by software, hardware, firmware, or any combination thereof. In one example, engine health monitoring device 204 (see FIG. 2) performs the data collection process 300 and process for determining engine health 400. In another example, portions of these processes 300, 400 relating to the storage of the stored data set 330 (see FIGS. 5-10) are performed by data storage device 205. Accordingly, one of ordinary skill will appreciate that various elements and devices can perform all or portions of the processes 300, 400 without departing from the scope of the invented method.

FIG. 3 depicts an exemplary data collection process 300. The data collection process 300 includes the steps of receiving 301 engine operating information 220 and receiving 302 additional information relating to the aircraft and/or the operating environment 240. The engine operating information 220 and additional information 240 may optionally be received from aircraft data bus 203 (see FIG. 2).

The data collection process 300 further includes determining 303 whether the engine operating information 220 represents a stable data point 320 (see FIGS. 5-10). That is, one or more mathematical data noise-reduction processes, which are generally known in the art, are applied to the engine operating information 220. As one example, one or more lag filters may be applied to the engine operating information 220. If the noise-reduction process reveals that the engine operating information 220 does not represent a stable data point 320, then the engine operating information 220 is discarded, and the data collection process 300 restarts 304.

The data collection process 300 further includes determining 305 whether the engine operating information 220 represents a valid data point 320 (see FIGS. 5-10). Various validity criteria may be selected and verified in order to determine whether the engine operating information 220 represents a valid data point 320. Such validity criteria may require reference to engine operating information 220 and/or additional information relating to the aircraft and/or the operating environment 240. For instance, one validity criteria may be that there is no weight on the landing gear 140 (see FIG. 1). Another exemplary validity criteria may be that MGT is greater than 1000° F. If all of the validity criteria are not met, then the engine operating information 220 is discarded, and the data collection process 300 restarts 304.

The data collection process 300 depicted in FIG. 3 includes the further step of determining and recording 307 a power parameter (e.g., torque value, power value, torque margin, or power margin) and a critical parameter (e.g., MGT, MGTc, or NGc value), from the engine operating information 220, as a data point 320 (see FIGS. 5-10). More specifically, in the embodiment of FIG. 3, the power margin, or "delta" between the 100% specification-level performance power and the actual measured power, for the given MGT, is determined. Once determined, the power margin and MGT data is then recorded as a data point 320 for further processing. One of ordinary skill in the art will appreciate that, alternatively, MGTc or NGc data might be recorded as a critical parameter in addition to, or in place of, MGT. Preferentially, MGT/MGTc data will be recorded if the engine ordinarily reaches its MGT limit before it reaches its NGc limit. And, conversely, NGc data will be recorded if the engine ordinarily reaches its NGc limit before it reaches its MGT limit.

In the embodiment of FIG. 3, the determining and recording step 307 also includes "correcting" the power parameter and the critical parameter based on additional information relating to the aircraft and/or the operating environment 240. For instance, if the outside air temperature is high, then a correction factor may be applied to the power margin data and MGT data, before the data point 320 is recorded. In this scenario, the data point 320 is corrected or normalized to eliminate variations in performance attributable to current installation losses, operating configurations, and environmental conditions. The resulting "corrected" data point 320, therefore, represents the engine's power if it were performing on a test stand under ideal conditions or standard conditions, at the given MGT, rather than installed on an aircraft and subjected to varying operating configurations and environmental conditions. Such a correction may be necessary, for instance, if the power parameter is MGT because the stored data set 330 will otherwise contain scattered data points 320, which may not be reduced to a fitted curve 440 (see FIGS. 5-10) due to the influence of other variables. It is, therefore, preferable that the stored data set 330 include corrected data points 320 (i.e., corrected power margin and MGTc values) rather than observed values (i.e., observed power margin and MGT values).

In an alternative embodiment, the raw values (i.e., the actual measured power—rather than a power margin—and the measured MGT) is recorded for further processing. However, it may be advantageous to record as a data point 320 only the power margin and MGTc data in order to optimize data handling and processing.

The data collection process 300, as depicted in FIG. 3, also includes merging 308 the recorded data point 320 with a stored data set 330. The stored data 330 set includes historical data points 320, based on previous power margin data and MGTc data. Merging 308 the newly recorded data point 320 with the stored data set 330 may include grouping the new data point 320 with statistically similar historical data points in the stored data set 330, and merging those statistically similar data points into a single, representative data point. This merging step 308 may further include purging one or more older data points from the stored data set 330. In this way, the stored data set 330 may change over time as new data is merged and old data is purged. The stored data set 330, therefore, is constantly updated to reflect the recent historical power margin (i.e., the "performance fingerprint") for the individual engine.

Referring still to FIG. 3, the process 300 includes the additional step of determining 309 whether to invoke the process for determining engine health 400. The process for determining engine health 400, which is used to determine engine health information 230, can be set to occur, for example, based on any combination of the following: (1) periodically based on time (e.g., every minute); (2) periodically based on flight hours (e.g., every fifteen minutes of flight time); (3) on demand (e.g., when the flight crew queries engine health information 230); (4) when engine health information 230 is transmitted off of the aircraft (e.g., when retrieved by a maintenance or diagnostic tool 209, or when transmitted to a base station 208 by a transceiver device 207); and/or (5) when recent power margin and MGTc data points 320 depart from historical data in the stored data set 330, potentially indicating a sudden or rapid degradation of engine health (e.g., when an engine suffers damage ingests foreign material). If, under one or more of the potential criteria, updating the engine health information 230 is due, then the process 400 (described in detail below, with reference to FIGS. 4-10) occurs. If, however, updating the engine health information 230 is not yet due to occur, then the data collection process 300 restarts 304.

FIG. 4 depicts an exemplary process for determining engine health 400. The process for determining engine health 400 includes selecting 401 an engine performance curve 430 to use in creating an engine health model. For instance, the selected performance curve 430 could be the engine's 100% specification-level performance curve 450 (see FIGS. 9-10). Alternatively, the selected performance curve 430 could be the engine's fully-deteriorated performance curve. As yet another example, the process 400 could select both the 100% specification-level performance curve 450 and the fully-deteriorated performance curve. In such an example, the analysis would proceed using both performance curves, and the curve that best fits the data would become the selected performance curve 430 used in creating an engine health model.

The process for determining engine health 400 further includes a curve-fitting process 402. The curve-fitting process 402 includes translating and rotating the selected performance curve 430 to best fit the stored data set 330. The process for determining engine health further includes the step of evaluating engine health 403. In this step, the fitted curve 440 resulting from the curve-fitting process 402 is compared to the 100% specification-level performance curve 450, to obtain an estimate for overall engine health. In addition, or as an alternative, the fitted curve 440 can also be evaluated at an extrapolation point 460 in order to determine an expected power margin, or performance level, at a given load (i.e., at a given MGT or MGTc). The engine health information 230 discussed above with reference to FIG. 2 may comprise an overall engine health estimate and/or an expected power margin at a given load. The curve-fitting process 402 and evaluation step 403 are described in greater detail below, with reference to FIGS. 5-10.

The process for determining engine health 400 further includes outputting 404 the resulting engine health information 230. Exemplary output devices (i.e., 205, 206, 207) and associated methods are discussed above, with reference to FIG. 2.

Figure 5:
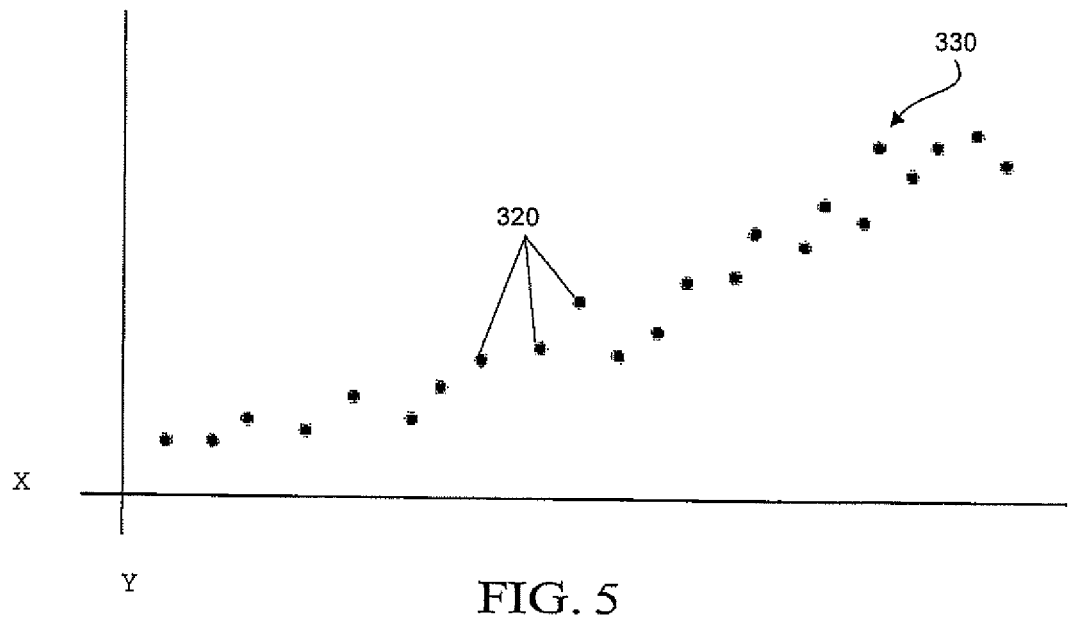
FIG. 5 is a chart of collected data for use in a process for determining engine health according to one embodiment.

Referring to FIG. 5, the curve-fitting process 402 of the depicted embodiment includes charting the stored data set 330, which comprises a constantly updating set of data points 320 representing historical power margin (y-axis) as a function of MGTc data (x-axis). As discussed above, the illustrated embodiment includes the steps of determining whether each data point is stable 303 and valid 305 as part of the data collection process 300 (see FIG. 3). However, one of ordinary skill will readily appreciate that these data-filtering steps can, alternatively, be taken as part of the curve-fitting process 402. That is, all data points 320 might be recorded as part of the stored data set 330. But when the curve-fitting process 402 begins with charting the stored data set 330, each data point 320 that is not both stable and valid may be ignored.

Figure 6:
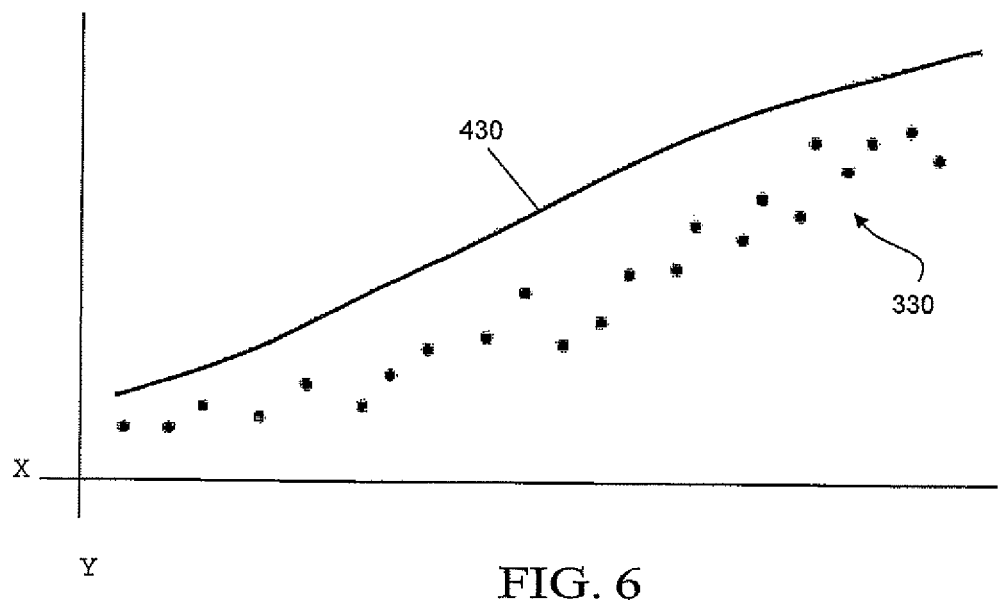
FIG. 6 is the chart of collected data according to the embodiment of FIG. 5, with a baseline engine performance curve introduced.
Figure 7:
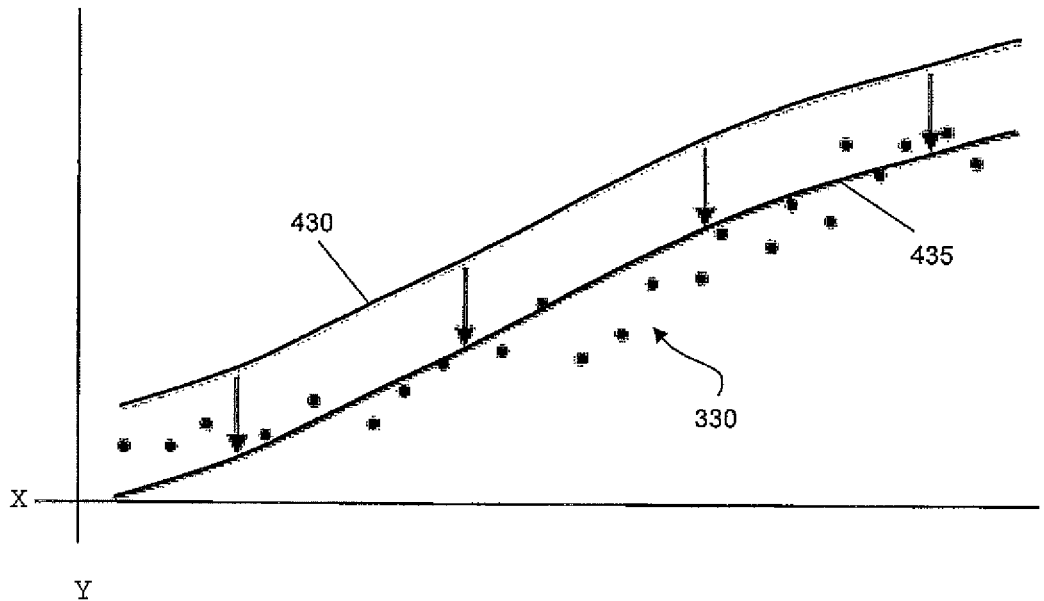
FIG. 7 is the chart of collected data according to the embodiment of FIG. 6, with the baseline engine performance curve translated to achieve the lowest error with respect to the collected data points.
Figure 8:
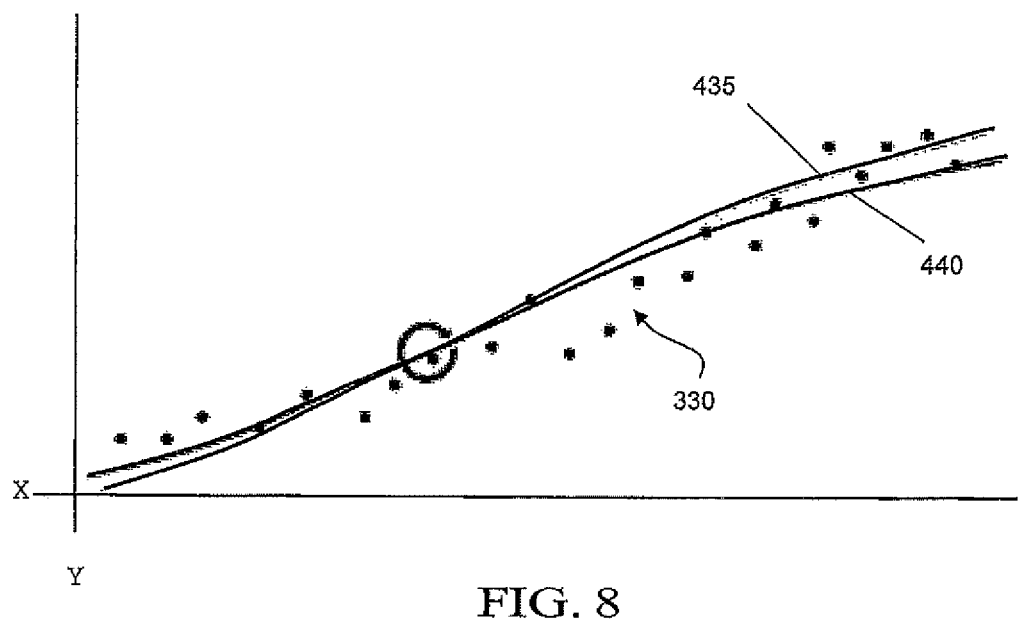
FIG. 8 is the chart of collected data according to the embodiment of FIG. 7, with the baseline engine performance curve rotated to achieve the lowest error with respect to the collected data points.

FIGS. 6-8 illustrate additional steps in the curve-fitting process 402. Referring to FIG. 6, the curve-fitting process 402 includes introducing the selected engine performance curve 430, which was selected as part of step 401 (see FIG. 4). As best shown in FIG. 7, the selected engine performance curve 430 is then translated (i.e., shifted without rotation) to achieve the lowest error with respect to the stored data set 330. This results in a translated curve 435. As illustrated in FIG. 8, the translated curve 435 is then rotated to achieve the lowest error with respect to the stored data set 330. This results in a fitted curve 440. One of ordinary skill in the art will appreciate that, alternatively, the rotation step (FIG. 8) could occur before translation (FIG. 7).

The translation and rotation of the selected engine performance curve 430 is preferably achieved based on an "optical fit." That is, the curve is translated and rotated so as to minimize the apparent error, or average distance, between the fitted curve 440 and the collection of data points 320. In alternative embodiments, a polynomial least square method can be used to as a fitting routine to create the fitted curve 440. However, extrapolations from a fitted curve 440 that results from a polynomial least squares fitting method may be less reliable.

Figure 9:
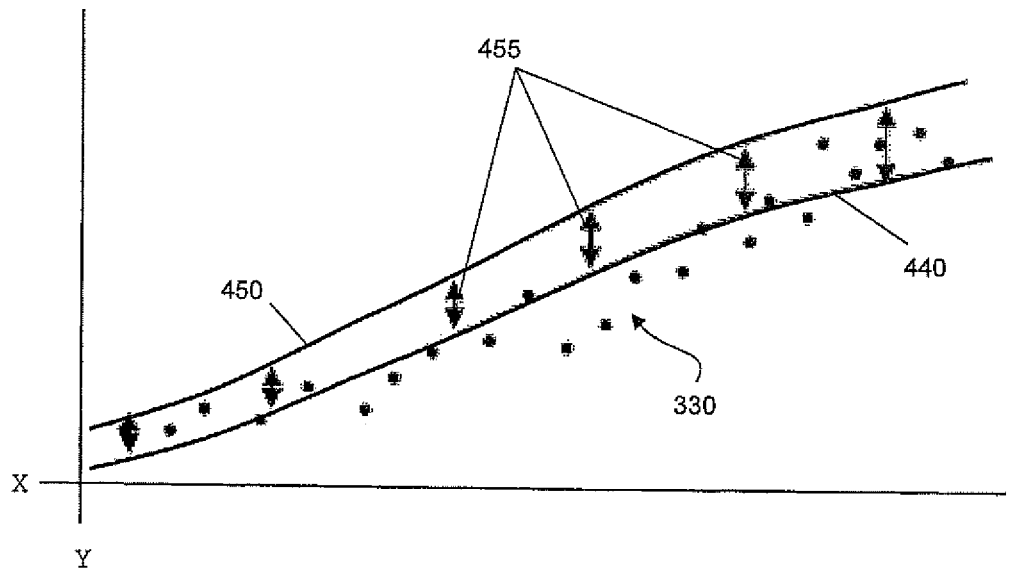
FIGS. 9 and 10 depict the chart of collected data according to the embodiment of FIG. 8, with the baseline engine performance curve reintroduced in its original position.
Figure 10:
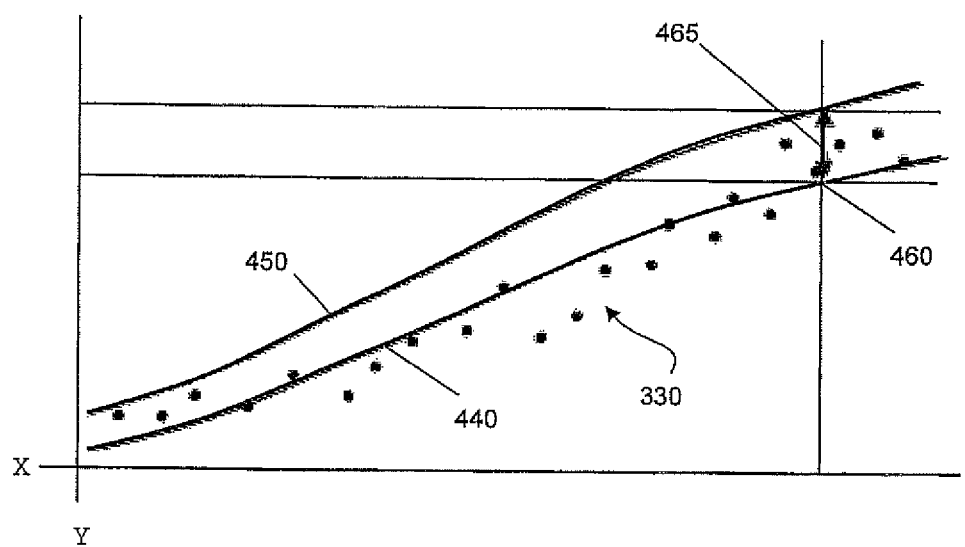

FIGS. 9 and 10 illustrate the step of evaluating engine health 403. As best shown in FIG. 9, the 100% specification-level performance curve 450 is introduced. The margins 455 between the fitted curve 440 and the 100% specification-level performance curve 450, are evaluated at various points to determine an overall estimate of engine health. As one skilled in the art will appreciate, this can be accomplished using well-known statistical methods.

Additionally, or as an alternative, FIG. 10 illustrates that the fitted curve 440 can be compared to the 100% specification-level performance curve 450, at a specific point 460, to determine the expected power margin 465 at a given load (i.e., at a given MGTc or MGT).

Whether the engine health information 230 takes the form of an overall estimate of engine health (FIG. 9), or an expected power margin at a given load (FIG. 10), the step of evaluating engine health 403 may include "correcting" the margin data 455, 465 based on the additional information relating to the aircraft and/or the operating environment 240. For instance, if the outside air temperature is high, then a correction factor may be applied to the power margin data 455, 465 before it is used to determine the engine health information 230 that will be output. That is, the margin data 455, 465 is corrected or normalized to eliminate variations in performance attributable to current installation losses, operating configurations, and environmental conditions. The resulting "corrected" engine health information 230, therefore, may represent the engine's power under real-world, installed conditions, rather than theoretical performance levels.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

The invention claimed is:

1. A method of reflecting recent corrected engine performance in a data storage device on an aircraft, the method comprising, by a computer comprising a processor and memory:

receiving, from an engine sensor coupled to the computer, engine operating information for an engine on the aircraft;

determining, from the engine operating information, a power parameter and a critical parameter;

correcting the power parameter and the critical parameter based on additional information available in an aircraft data bus on the aircraft;

recording, as a data point in a stored data set in the data storage device, the corrected power parameter and the corrected critical parameter;

grouping the data point with statistically similar historical data points in the stored data set;

merging the data point and the statistically similar historical data points into a single representative data point in the stored data set, the stored data set including previously recorded power parameter and critical parameter data points; and wherein the merging comprises purging one or more older data points in the stored data set.

2. The method according to claim 1, wherein the receiving the engine operating information includes receiving the engine operating information from the aircraft data bus.

3. The method according to claim 1, wherein the critical parameter is an MGT value.

4. The method according to claim 1, wherein the power parameter is a power margin.

5. The method according to claim 1, wherein the data point represents the engine's power if it were performing on a test stand under standard conditions.

6. The method according to claim 1, further comprising:

determining whether the power parameter and the critical parameter represent a stable data point; and discarding the engine operating information in the event that the power parameter and the critical parameter do not represent a stable data point.

7. The method according to claim 1, further comprising:

determining whether the power parameter and the critical parameter represent a valid data point; and discarding the engine operating information in the event that the power parameter and the critical parameter do not represent a valid data point.

8. The method according to claim 7, wherein the determining whether the power parameter and the critical parameter represent a valid data point comprises determining whether there is weight on landing gear.

9. The method according to claim 1, wherein the correcting comprises applying a correction factor based on an outside air temperature.

10. The method of claim 1, comprising determining whether to invoke a process for determining engine health, wherein the determining is based, at least in part, on a result of the merging.

11. A computer system comprising a processor and memory, wherein the processor and the memory in combination implement a method of reflecting recent corrected engine performance in a data storage device on an aircraft, the method comprising:

receiving, from an engine sensor coupled to the computer system, engine operating information for an engine on the aircraft;

determining, from the engine operating information, a power parameter and a critical parameter;

correcting the power parameter and the critical parameter based on additional information available in an aircraft data bus on the aircraft;

recording, as a data point in a stored data set in the data storage device, the corrected power parameter and the corrected critical parameter;

grouping the data point with statistically similar historical data points in the stored data set;

merging the data point and the statistically similar historical data points into a single representative data point in the stored data set, the stored data set including previously recorded power parameter and critical parameter data points; and wherein the merging comprises purging one or more older data points in the stored data set.

12. The computer system according to claim 11, wherein the receiving the engine operating information includes receiving the engine operating information from the aircraft data bus.

13. The computer system according to claim 11, wherein the critical parameter is an MGT value.

14. The computer system according to claim 11, wherein the power parameter is a power margin.

15. The computer system according to claim 11, wherein the data point represents the engine's power if it were performing on a test stand under standard conditions.

16. The computer system according to claim 11, the method further comprising:

determining whether the power parameter and the critical parameter represent a stable data point; and discarding the engine operating information in the event that the power parameter and the critical parameter do not represent a stable data point.

17. The computer system according to claim 11, the method further comprising:

determining whether the power parameter and the critical parameter represent a valid data point; and discarding the engine operating information in the event that the power parameter and the critical parameter do not represent a valid data point.

18. The method according to claim 17, wherein the determining whether the power parameter and the critical parameter represent a valid data point comprises determining whether there is weight on landing gear.

19. The computer system according to claim 11, wherein the correcting comprises applying a correction factor based on an outside air temperature.

20. A computer-program product comprising a non-transitory computer-usable medium having computer-readable program code embodied therein, the computer-readable program code adapted to be executed to implement a method of reflecting recent corrected engine performance in a data storage device on an aircraft, the method comprising:

receiving, from an engine sensor coupled to a computer, engine operating information for an engine on the aircraft;

determining, from the engine operating information, a power parameter and a critical parameter;

correcting the power parameter and the critical parameter based on additional information available in an aircraft data bus on the aircraft;

recording, as a data point in a stored data set in the data storage device, the corrected power parameter and the corrected critical parameter;

grouping the data point with statistically similar historical data points in the stored data set;

merging the data point and the statistically similar historical data points into a single representative data point in the stored data set, the stored data set including previously recorded power parameter and critical parameter data points; and wherein the merging comprises purging one or more older data points in the stored data set.

* * * * *